(12) United States Patent  (10) Patent No.: US 6,519,815 B2
Cassel et al.  (45) Date of Patent: *Feb. 18, 2003

(54) BAND CLAMP (75) Inventors: Thomas R. Cassel, Birmingham, MI (US); Michael E. Amedure, Lake Orion, MI (US)

(73) Assignee: BKS Company, LLC, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/921,764

(22) Filed: Aug. 3, 2001

(65) Prior Publication Data

US 2001/0047572 A1 Dec. 6, 2001

Related U.S. Application Data

(63) Continuation-in-part of application No. 09/330,626, filed on Jun. 11, 1999, now Pat. No. 6,269,524.
(60) Provisional application No. 60/088,868, filed on Jun. 11, 1998, and provisional application No. 60/107,610, filed on Nov. 9, 1998.

(51) Int. Cl.$^7$ ................................................ F16L 33/04
(52) U.S. Cl. ........................................................ 24/279
(58) Field of Search ................................ 24/19, 20 LS, 24/279, 284, 286; 285/419, 420

(56) References Cited

U.S. PATENT DOCUMENTS

| 3,507,314 | A | | 4/1970 | Zartler |
| 3,905,623 | A | | 9/1975 | Cassel |
| RE30,042 | E | | 7/1979 | Hiemstra et al. |
| 4,261,600 | A | | 4/1981 | Cassel |
| 4,310,956 | A | * | 1/1982 | Meckstroth et al. |
| 4,312,526 | A | * | 1/1982 | Cassel |
| 4,364,588 | A | | 12/1982 | Thompson |
| 4,660,862 | A | | 4/1987 | Cassel et al. |
| 4,813,720 | A | * | 3/1989 | Cassel |
| 5,131,698 | A | * | 7/1992 | Calmettes et al. |
| 5,271,648 | A | | 12/1993 | Krausz |
| 5,310,158 | A | | 5/1994 | Cassel |
| 5,842,725 | A | * | 12/1998 | Allert |
| 6,269,524 | B1 | * | 8/2001 | Cassel |

FOREIGN PATENT DOCUMENTS

DE  4200265 A1 * 7/1992

* cited by examiner

Primary Examiner—James R. Brittain
(74) Attorney, Agent, or Firm—Reising, Ethington, Barnes, Kisselle, Learman & McCulloch, PC

(57) ABSTRACT

A band clamp for pipe joints is disclosed comprising a band with confronting sidewalls when wrapped around pipes to be coupled. The clamping mechanism includes a pair of force bars outboard of the sidewalls and a spline with concave surfaces on opposite sides, the spline being disposed between the end flanges. A bolt extends through bolt holes and draws the flanges against the spline to stretch the band around the pipes when the bolt is tightened against the force bars. The sidewalls have lateral flanges which overhang the spline to arrest movement of the sidewalls relative to the spline to obtain alignment of the bolt holes when the clamp is tightened. In some embodiments, the band is folded back on itself to form a double thickness which extends from the upper end of each sidewall to a point beyond the lower end of the sidewall and provides an inverted flap sandwiched between the clamp band and the pipe. The inverted flap may be secured to the band by mechanical interlock between the layers.

8 Claims, 10 Drawing Sheets

BAND CLAMP

This application is a continuation-in-part of U.S. application Ser. No. 09/330,626 filed Jun. 11, 1999, now U.S. Pat. No. 6,269,524 B1, which claims the benefit of U.S. Provisional application No. 60/088,868 filed Jun. 11, 1998 and Provisional application No. 60/107,610 filed Nov. 9, 1998 and the benefit of the priority thereof is claimed under Title 35 U.S.C. Section 1120 and Section 119(e).

FIELD OF THE INVENTION

This invention relates to band clamps and more particularly, it relates to band clamps which are useful for pipe joints such as those used in vehicle exhaust systems.

BACKGROUND OF THE INVENTION

In vehicle exhaust systems, it is desirable to provide a pipe joint with high pull-apart strength and with a good fluid seal between the pipes. For both lap joints and butt joints, a band clamp has been provided in the prior art which admirably meets the requirements of pull-apart strength and fluid sealing. However, in some applications of a certain type of high tension band clamps often referred to as the "TORCA™ clamp", there has been a problem in some cases of inadequate force or loading applied by the clamp to pipe joints. In other cases there is a problem of breakage of a clamping bolt during installation or service of the clamp. Applicant has discovered the cause of these problems and has discovered a solution which is realized in accordance with the invention set forth herein.

In the prior art, high tension band clamps of the TORCA™ type are disclosed in Cassel U.S. Pat. No. 4,312,526 granted Jan. 26, 1982 and Cassel et al. U.S. Pat. No. 4,629,226 granted Dec. 16, 1986. U.S. Pat. No. 4,312,526 is especially suited for either lap joints or butt joints in vehicle exhaust systems in which the clamp band is made of relatively thin material. The band clamp of U.S. Pat. No. 4,629,226 is especially adapted for lap joints in vehicle exhaust systems wherein the clamp band is made of relatively thick material.

Both of the high tension band clamps mentioned above are characterized by structure and operation as follows. The clamp comprises a clamp band which is disposed around a member, such as a pipe which is to be joined with another pipe. The clamp band is, for the most part, circular or roundish in cross-section and is adapted to fit around the pipe. The ends of the roundish sector terminate in a channel-shaped sector which comprises a pair of sidewalls extending radially outwardly from the roundish sector. The clamp band is made of a single piece of sheet metal and each free end thereof is folded back on itself to form a double layer. Thus, the sidewalls are of double thickness and terminate at their outer ends in respective loops or bights. The bights serve as retaining members for restricting the movement of the sidewalls when the tightening means is tightened. The clamp band is tightened around the pipe by tightening means which comprises a reaction member or spline which is disposed within the channel-shaped sector and which is adapted to seat upon the pipe. For this purpose, the spline has an inner surface of arcuate configuration conforming to the pipe. The spline is provided on each side with a laterally facing concave surface. The tightening means further includes a bolt which extends through the sidewalls and the spline. The threaded end of the bolt extends through a spacer or bar which is disposed outside one sidewall and which has a convex surface which is opposite one concave surface of the spline. The bolt has a head with a convex inner surface which is disposed outside the other sidewall opposite the other concave surface on the other side of the spline. Alternatively, a bolt with a conventional head may be used and a separate bar with a convex surface is disposed under the bolt head opposite the other concave surface of the spline. A nut on the threaded end of the bolt is tightened to draw the sidewalls toward engagement with the spline and thus develop high tension in the clamp band.

I have discovered that tightening of the bolt to seat the sidewalls against the spline causes the free ends of the sidewalls to be pulled toward the pipe with slippage relative to the spline which becomes firmly seated on the pipe during the tightening operation. This slippage causes the sidewalls to engage the bolt at the periphery of the bolt holes in the sidewalls and to pull the bolt toward the pipe. As a result, the bolt becomes firmly seated against the periphery of the bolt hole in the spline. Additional tightening of the bolt causes additional downward slippage of the sidewalls relative to the spline. This causes the two sidewalls to apply a bending moment on the bolt on opposite sides of the spline which acts as a fulcrum for the bolt. The retaining members on the sidewalls are adapted to limit the amount of slippage of the free ends of the sidewalls relative to the spline so that high tension can be developed in the clamp band when the tightening of the bolt is completed. Because of variation of dimensions of the parts within the allowable tolerances of manufacture, there will be some joints in which the bolt is subjected to bending stresses before the retaining members arrest the free ends of the sidewalls. In a pipe joint where the bolt is bent by the downward force of the two sidewalls pulling it into engagement with the spline, the bolt will be placed in tension across the upper part of its cross-section and it will be placed in compression across the lower part of its cross-section. Since only a fraction of the bolt cross-section is in tension the clamping force achieved by the clamp band is significantly less than the full potential. This can result in a joint with reduced pull-apart strength or reduced sealing. Also, with only a fraction of the cross-section of the bolt in tension, the tensile strength of the bolt is significantly reduced and the tensile forces which must be developed to tighten the clamp will exceed the tensile strength of the bolt and cause it to break.

A general object of this invention is to overcome certain disadvantages of the prior art and to provide a high tension band clamp with a reduced incidence of bolt breakage upon tightening of the clamp.

SUMMARY OF THE INVENTION

In accordance with this invention, a band clamp is provided which is capable of providing a pipe joint with good fluid sealing and high pull-apart strength and which can be manufactured at low cost.

Further, in accordance with this invention, means are provided in a clamp of "Torca™" type for preventing the bolt holes in the sidewalls from becoming misaligned with the bolt hole through the spline during tightening of the clamp.

Further, in accordance with this invention, an open sleeve band clamp has a band with a double layer in the sidewalls and in the adjacent portions of the roundish sector, said double layer being provided by folding each free end of the band back on itself to form a flap on the inside of the band for engagement with the workpiece to be clamped, each such flap being referred to herein as an inverted flap. The inverted flap is sufficiently long to extend in a layered disposition with a portion of roundish sector of the band to form a flap-band interface region. In this position, the inverted flap becomes sandwiched between the outer layer of the band and the workpiece and is thereby held against creeping movement as the clamp is tightened.

Further, in accordance with the invention, a mechanical interlock is provided between the inverted flap and the band in the flap-band interface region.

Further, in accordance with the invention, a rigid stop member is provided on the free end of each sidewall to coact with an abutment on outer end of the spline and arrest movement of the sidewall during tightening of the clamp, with the bolt holes of the sidewalls in alignment with the bolt hole in the spline.

A complete understanding of this invention may be obtained from the detailed description that follows taken with the accompanying drawings.

BEST MODE FOR CARRYING OUT THE INVENTION

Referring now to the drawings, there are shown illustrative embodiments of the invention in a band clamp which is especially adapted for use in vehicle exhaust systems. It will be appreciated as the description proceeds that the invention is useful in other embodiments and other applications.

First Embodiment of the Invention

Figure 1:
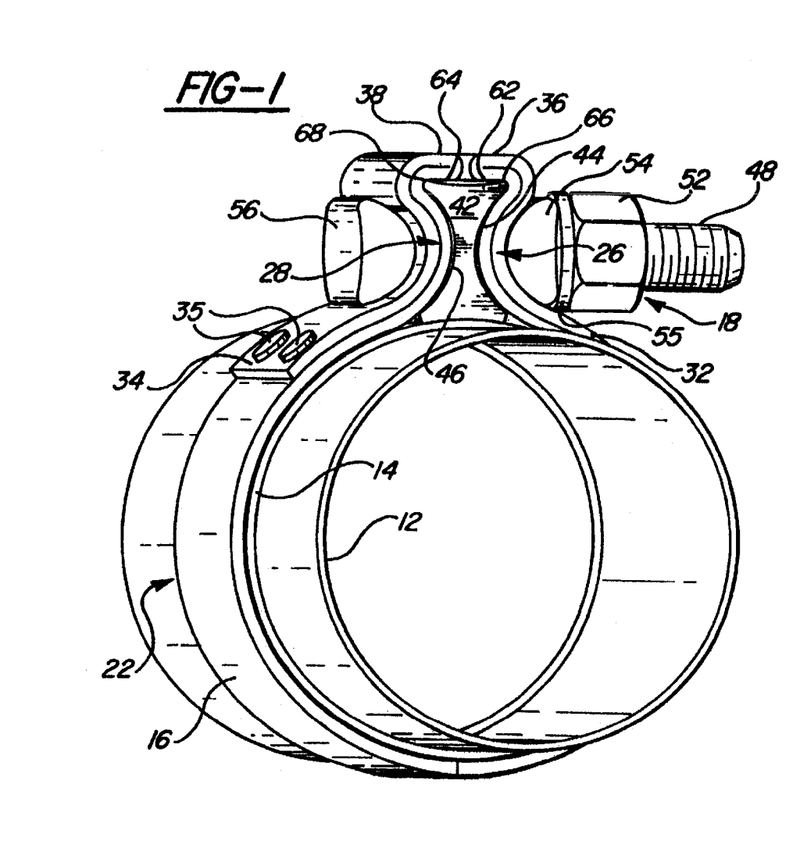
FIG. 1 is a perspective view of the band clamp of this invention in a first embodiment.
Figure 2:
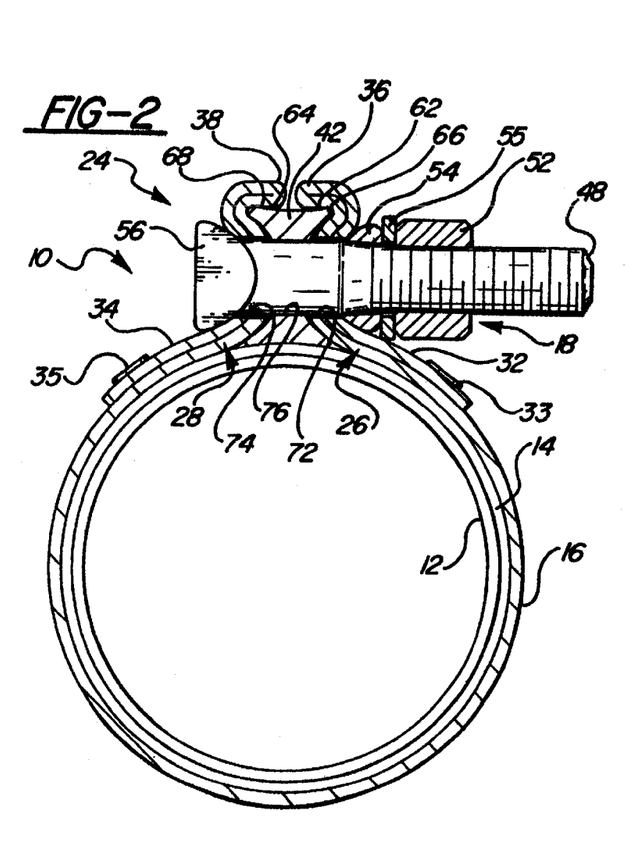
FIG. 2 is a cross-sectional view of the band clamp of FIG. 1.

The band clamp of this invention in a first embodiment will be described with reference to FIGS. 1 and 2. As shown in FIGS. 1 and 2, the band clamp 10 forms a pipe lap joint with inside and outside pipes 12 and 14, respectively, in telescoping relationship. The outside pipe 14 has a lap portion which extends over the inside pipe 12 to provide an overlap region of the pipes under the band clamp 10. In order to provide a fluid seal between the pipes, a collapsible sealing zone (not shown) is provided on the outside pipe 14 in the overlap region. This pipe joint is, for example, of the type shown in the above-mentioned Cassel et al. U.S. Pat. No. 4,629,226.

The clamp 10 comprises a clamp band 16 which is disposed around the outer pipe 14 over the sealing zone. The clamp band 16 is provided with a tightening means 18. The clamp band 16 is, for the most part, circular or roundish in cross-section. It has a roundish sector 22 adapted to fit around the sealing zone on the pipe 14 and a channel-shaped sector 24 which comprises a pair of flanges or sidewalls 26 and 28 extending radially outwardly from the roundish sector. The clamp band 16 is made of a single piece of sheet metal and each free end thereof is folded back on itself to form outer layers or flaps 32 and 34 which overlay the inner layer in face-to-face engagement. In this manner, the sidewalls 26 and 28 and a portion of the roundish sector 22 are made of double thickness. This provides a cross-sectional area in the section of the sidewall through the bolt hole which is equal to or greater than that in the single layer portion of the band. The flaps 32 and 34 are secured to the inner layer of the clamp band 16 by respective weldments 33 and 35 which inhibit slippage of the inner layer relative to the flaps. The sidewalls are provided at their outer ends with respective lateral flanges or ears which constitute stop members 36 and 38 which will be described in greater detail below.

The clamp band 16 is tightened around the pipe 14 by the tightening means 18. The tightening means comprises a reaction member or spline 42 which is disposed within the channel-shaped sector 24 and extends outwardly from the pipe 14 with its inner end adapted to seat upon the outer surface of the pipe 14. For this purpose, the spline has an inner surface of arcuate configuration conforming to the pipe. The spline 42 is provided with a pair of oppositely facing concave surfaces 44 and 46. The tightening means 18 includes a bolt 48 and a nut 52. It also includes a spacer or bar 54 and a washer 55 disposed outside the sidewall 26. The bar 54 has a convex surface which is opposite the concave surface 44 of the spline 42. The bolt 48 has a head in the form of a bar 56 with a convex surface which is disposed outside the sidewall 28 opposite the concave surface 46 on the spline 42. The bolt extends through bolt holes in the sidewalls 26 and 28, the spline 42, washer 55 and the spacer 54.

When the clamp 10 is assembled and the nut 52 is tightened on the bolt 48, the relationship of the parts is as shown in FIGS. 1 and 2. It will be understood that, before the nut is tightened, the sidewalls 26 and 28 of the channel-shaped sector 24 are not seated against the spline 42. When the nut is tightened, the bolt head 56 and the spacer 54 are drawn together and press the sidewalls 26 and 28 into engagement with the spline 42. Depending upon the degree of tightening, the sidewalls may be only partially seated against the spline. As a result of this tightening action, the roundish sector 22 is stretched around the pipe 14 in tight engagement therewith. This tightening action of the clamp 10 exerts sufficient force on the sealing zone to provide a good fluid seal and high pull-apart strength in the pipe joint.

The relationship of the parts of the clamp 10 when it is in the tightened condition will now be described in greater detail with reference to FIG. 2. The stop member 36 has a stop surface 62 on its lower side which is engaged by an abutment surface 66 on the upper end of the spline 42 when the clamp 10 is tightened. Similarly, the stop member 38 has a stop surface 64 on its lower side which is engaged by an abutment surface 68 on the upper end of the spline 42. With the clamp in the tightened condition, the inner end of the spline 42 is firmly seated against the outer pipe 14.

As noted above, the clamp band 16 is made from a single piece of sheet metal and each end thereof is folded back on itself to form an outer layers or flaps 32 and 34 which overlay the inner layer in face-to-face engagement. It should be noted here that the clamp band is preformed to a configuration which is generally similar to that shown in FIG. 2 except that the channel-shaped sector 24 is open wider such that either or both sidewalls 26 and 28 may be located outboard of the spline 42. When the clamp is tightened by the nut 52, the sidewalls are drawn toward the spline and the stop members 36 and 38 move into the position over the end of the spline 42, as shown in FIG. 2, without substantial interference.

During the fabrication of the clamp band 16 prior to the pre-forming of the sidewalls 26 and 28, the bolt holes 72 and 74 through the sidewalls are punched with the clamp band in a flat condition. The desired spacing between the bolt holes through the sidewalls is that which results in alignment of the centerlines of the bolt holes 72 and 74 through the sidewalls 26 and 28 with each other and with the centerline of the bolt hole 76 through the spline 42 when the clamp is tightened to the condition shown in FIG. 2. This spacing of the bolt holes 72 and 74 from each other is determined in accordance with the diameter of pipe 14, height of the spline 42 and location of the bolt hole 76 through the spline 42 as described below.

Figures 3, 4, 5, 6:
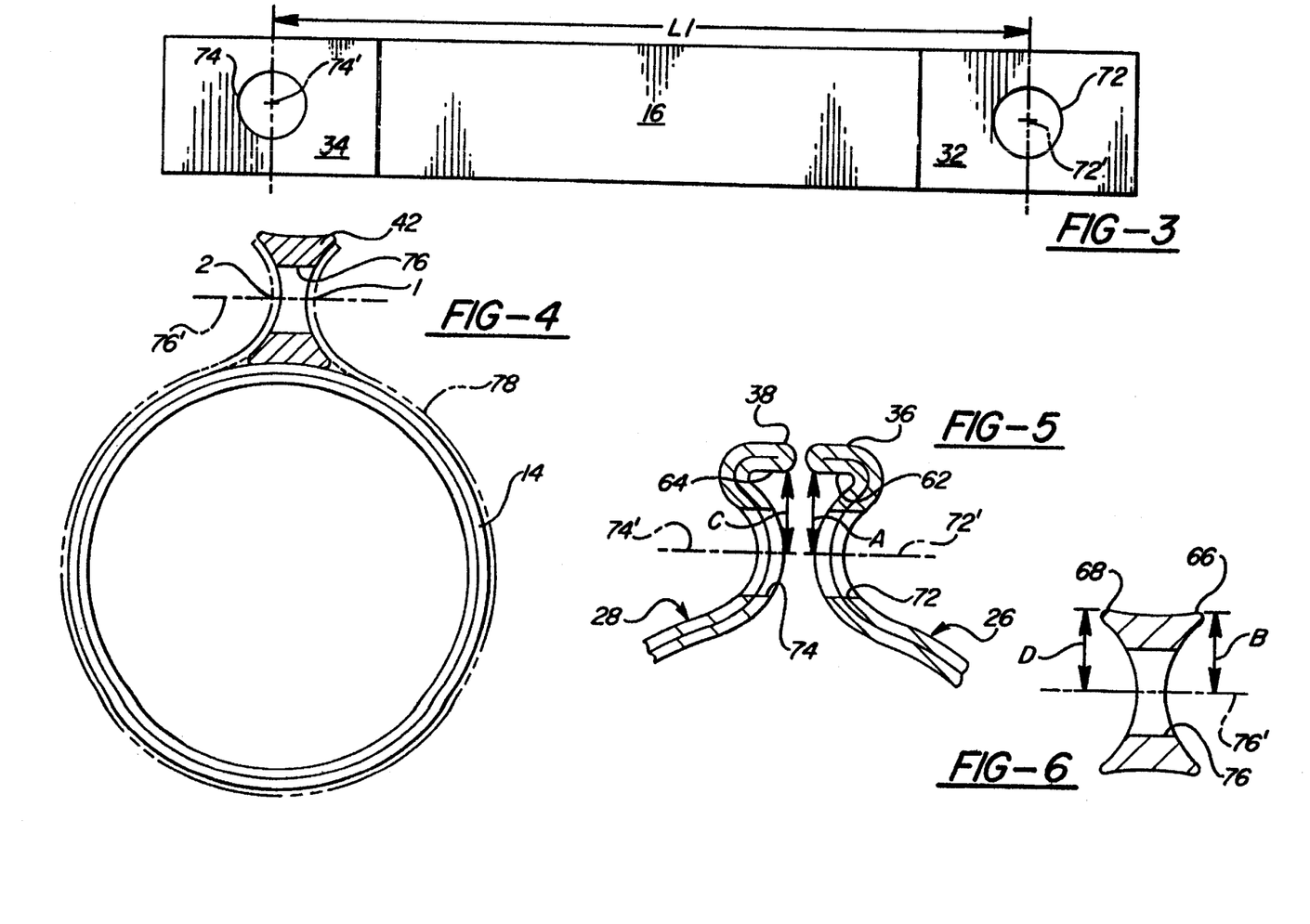
FIG. 3 is a view of the clamp band in a flat condition at an intermediate stage of forming.
FIG. 4 is a cross-sectional view, for explanatory purposes, of inside and outside pipes to be joined and a spline seated on the outer pipe.
FIG. 5 is a cross-sectional view of a portion of the sidewalls of the clamp band of this invention.
FIG. 6 is a cross-sectional view of the spline of the clamp.

The relationship of the parts of the band clamp of this invention will be described in greater detail with respect to FIGS. 3, 4, 5 and 6. FIG. 3 shows the clamp band in a flat condition with the flaps 32 and 34 folded back on the clamp band. The bolt holes 72 and 74 may be punched through the double layer portion of the clamp band 16 formed by the flaps. The length of the clamp band L1 between the centerlines of the bolt holes 72 and 74 is shorter than a length L2 which is equal to the length of an imaginary line 78 (shown in dashed lines in FIG. 4) which extends from a starting-point 1 on the centerline 76' of the bolt hole 76 and extends around the outer pipe 16 to an ending-point 2 at the centerline 76' on the other side of the spline 42. The imaginary line 78 lies in a plane which contains the centerline 76' and is perpendicular to the centerline of the outside pipe 14. The imaginary line 78 follows the contour of the spline 42 and the pipe 14. The length of the clamp band L1 between the bolt hole centerlines 72' and 74' is shorter, when the clamp band 16 is unstressed, than the length of the imaginary line 78 by a predetermined length ΔL. The value of ΔL is such that the clamp exerts radially directed forces on the outside pipe 14 when the clamp is fully tightened so that the outside pipe 14 is circumferentially collapsed into close engagement with the inside pipe 12 and exerts a radially compressive force against the inside pipe. This relationship of the parts of the clamp band 16 to the outside and inside pipes is already known in the band clamps of the Torca™ type identified above.

In order to minimize bending stresses in the bolt, the centerlines 72' and 74' of the first and second sidewall bolt holes 72 and 74 are positioned, during tightening, into alignment with the centerline 76' of the spline bolt hole 76 by the structural relationship of the elements of the band clamp and the outer pipe 14. This structural relationship will be described with reference to FIGS. 5 and 6. The stop surface 62 on the stop member 36 is a distance A from the centerline 72' of the bolt hole 72 through the sidewall 26 when measured perpendicularly to the centerline 72'. The abutment surface 66 is a distance B from the centerline 76' of the spline 42 when measured perpendicularly to the centerline 76'. The distance A is equal to the distance B. The stop surface 64 is a distance C from the centerline 74' of the bolt hole 74 in the sidewall 28 when measured perpendicularly to the centerline 74'. The abutment surface 68 is a distance D from the spline centerline 76' when measured perpendicularly to that centerline. The distance C is equal to the distance D. With this structural relationship, the bolt holes through the sidewalls and the splines are maintained in substantial alignment during tightening of the clamp and the bending stresses on the bolt are minimized.

When the clamp 10 is tightened around a pipe or other workpiece, the bending stresses in the bolt 48 are minimized because the centerlines 72' and 74' of the first and second bolt holes 72 and 74 are maintained in alignment with the centerline 76' of the spline bolt hole 76 by the coaction of the stop surfaces 62 and 64 with the abutment surfaces 66 and 68, respectively. This result is obtained notwithstanding the stretching of the clamp band 16 around the pipe.

As described above, the length L1 of the clamp band 16 from the centerline 72' of said first sidewall bolt hole 72 to the centerline 74' of said second sidewall bolt hole 74 is shorter, before tightening of the clamp than the length L2 of line 78. This relationship allows for stretching of a clamp band 16 to obtain the desired clamping forces when the bolt 48 is tightened to the specified torque. During tightening, the first and second stop members 36 and 38 are pulled down until stop surfaces 62 and 64 engage abutments 66 and 68, respectively, on spline 42. The stop members 36 and 38 are sufficiently rigid so as to not yield significantly with continued tightening of the clamp to stretch the band 16 around the workpiece. Since the distances A and B are equal to distances C and D, respectively, the bolt holes through the sidewalls and the spline are maintained in alignment during tightening of the clamp.

Second Embodiment of the Invention

The second embodiment of the invention will be described with reference to FIGS. 7 through 11. This embodiment of the invention differs from that described with reference to FIGS. 1 through 6 in that the clamp band is formed as a single layer of sheet metal from end-to-end. Other parts remain the same and the same reference characters are applied to such parts and, in the interest of brevity, the description of such parts will not be repeated.

Figure 7:
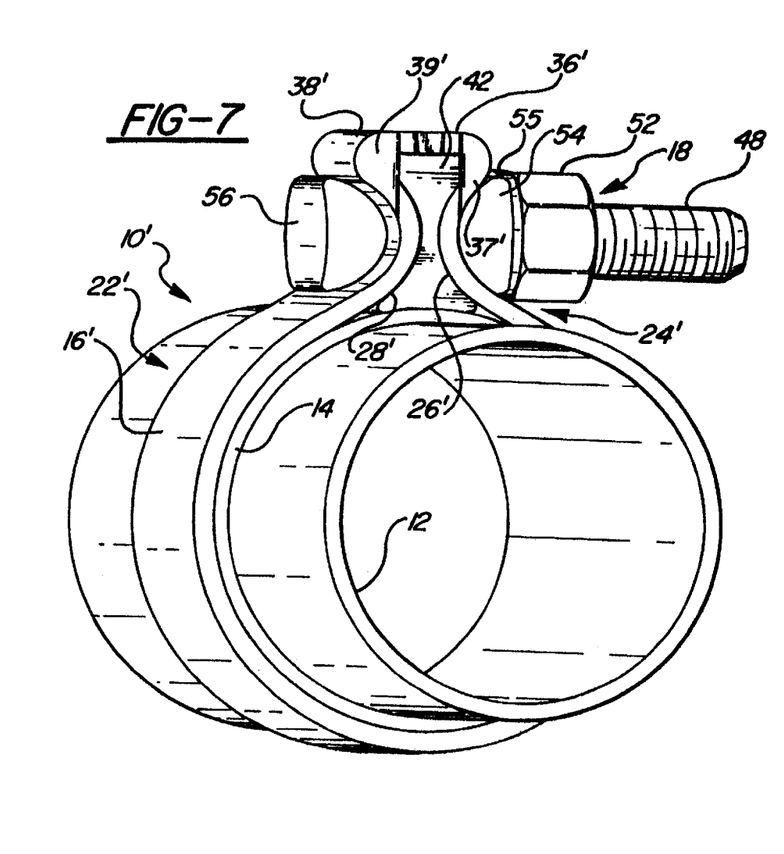
FIG. 7 is a perspective view of the band clamp of this invention in a second embodiment.
Figure 8:
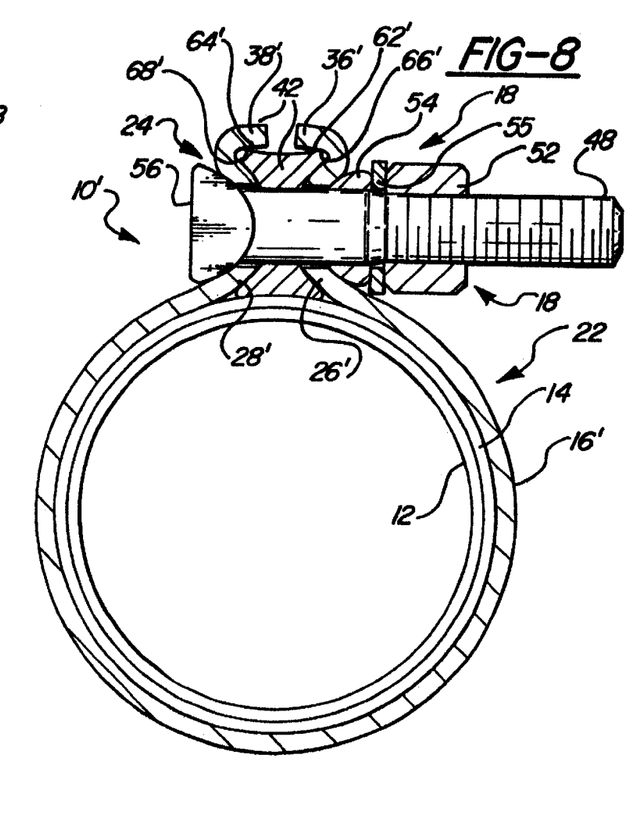
FIG. 8 is a cross-sectional view of the band clamp of FIG. 7.

The band clamp as shown in FIGS. 7 and 8 comprises a clamp band 16' which is disposed around the outside pipe 14 for joining it to the inside pipe 12. The clamp 10' comprises the clamp band 16' which is provided with a tightening means 18. The clamp band 16' has a roundish sector 22' adapted to fit around the sealing zone on the pipe 14 and a channel-shaped sector 24' which comprises a pair of flanges or sidewalls 26' and 28' extending radially outwardly from the roundish sector. The clamp band 16' is made of a single piece of sheet metal and the sidewalls terminate at their outer end in respective stop members 36' and 38'.

The relationship of the parts of the clamp 10' in the tightened condition, as shown in FIGS. 7 and 8, will now be described in greater detail with reference to FIG. 8. The stop member 36' has a stop surface 62' on its lower side which is engaged by an abutment surface 66' on the upper end of the spline 42 when the clamp is tightened. Similarly, the stop member 38' has a stop surface 64' on its lower side which is engaged by an abutment surface 68' on the upper end of the spline 42. In this tightened condition, the inner end of the spline 42 is firmly seated against the outer pipe 14.

The stop member 36' is provided at both ends with a gusset 37' and similarly, stop member 38' is provided at both ends with a gusset 39' as shown in FIG. 7 (see also FIGS. 9, 10 and 11 described below). The gussets 37' and 39' are provided to resist bending of the stop members 36' and 38' by outward force exerted thereon by the spline 42 during tightening of the clamp. The gussets 37' are formed by a stamping operation on the ends of the sidewall 26' and the stop member 36' to deform the metal at each end so that it forms a bridge, which constitutes the gusset, between the sidewall and the stop member. The gussets 39' are formed in the same manner on the ends of the sidewall 28' and stop member 38.

Figure 9:
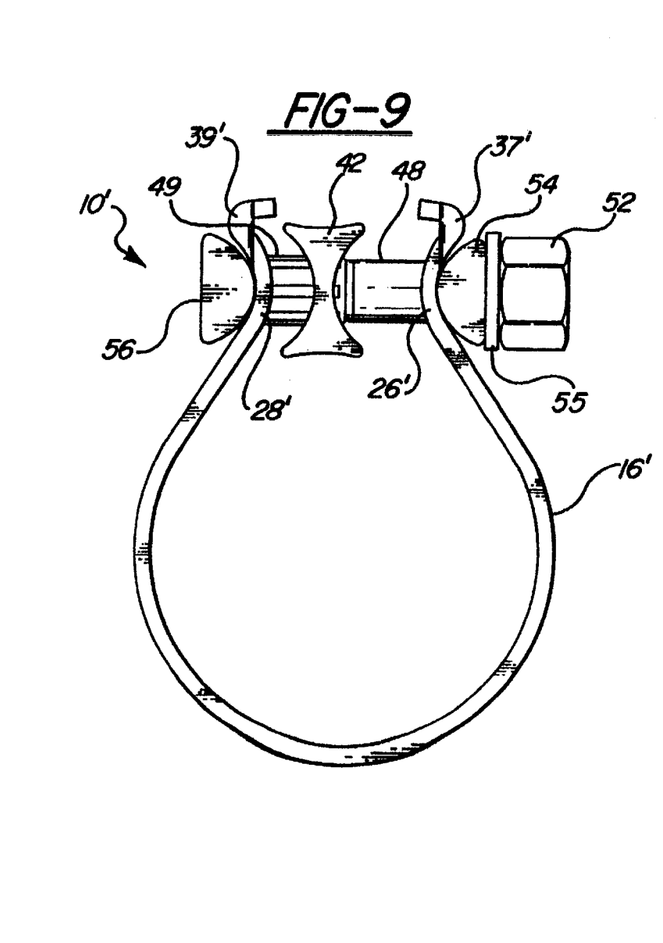
FIG. 9 is an end elevation view of the clamp of FIG. 7 before it is applied to pipes which are to be joined together.
Figure 10:
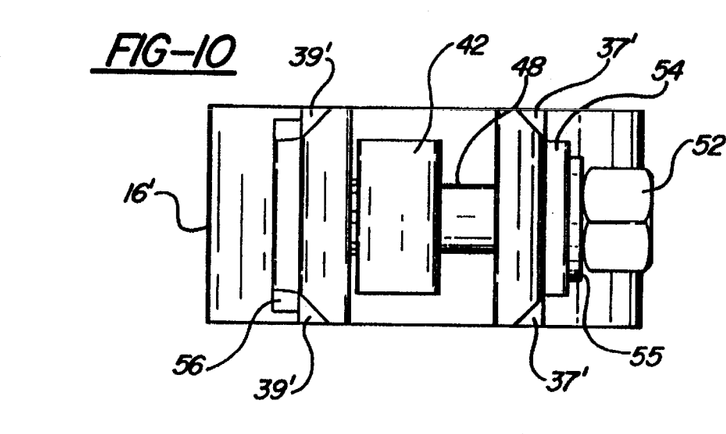
FIG. 10 is a plan view of the clamp of FIG. 8.
Figure 11:
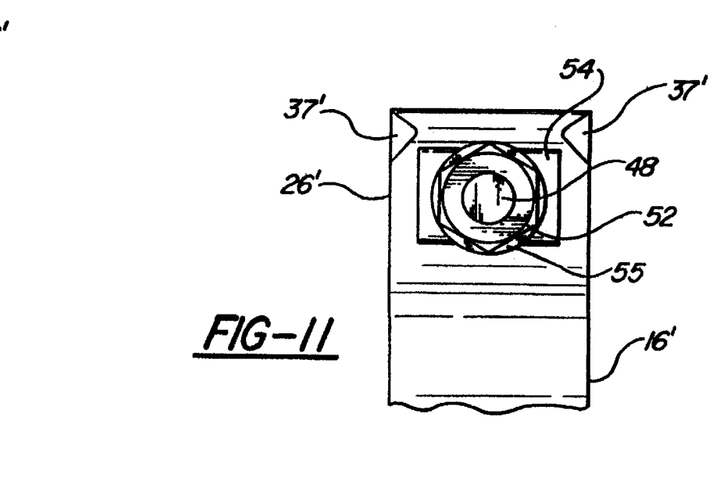
FIG. 11 is a side elevation view of the clamp of FIG. 8.

FIGS. 9, 10 and 11 show the second embodiment of the band clamp before it is applied to the pipes 12 and 14. As shown, the parts of the clamp are loosely assembled with the nut 52 screwed onto the end of the bolt 48 sufficiently to hold the parts together. In this condition, the sidewalls 26' and 28' are not seated against the spline 42. Note that the bolt 48 is formed with a splined section 49 which provides an interference fit with the spline 42 to hold the spline captive for convenience of installation of the clamp.

The clamp 10' of FIG. 8 functions in the same manner as the clamp 10 of FIG. 1 in respect to the coaction of the stop members 36 and 38 with the abutments 66 and 68, respectively to align the bolt holes with each other when the clamp is in the tightened condition.

Third Embodiment of the Invention

A third embodiment of the invention will be described with reference to FIG. 12. The band clamp 10b is similar to the clamp 10 of FIGS. 1–6 except that the clamp band 16b is provided with inner or inverted flaps 32b and 34b which underlay the outer layer in face-to-face engagement. Additionally, in this embodiment, the flaps 32b and 34b are secured to the outer layer of the clamp band by respective mechanical interlocks 33b and 35b.

The clamp band 16b is made of a single piece of sheet metal and each free end thereof is folded back on itself to form the inverted flaps 32b and 34b. This provides a double thickness and hence greater strength for the sidewalls 26b and 28b and also for adjacent portions of the roundish sector 22. The inverted flaps are sufficiently long to extend into the roundish sector 22 of the clamp band thereby forming an overlap region with the roundish portion. In this region, the inverted flaps 32b and 34b become sandwiched between the roundish portion of the band 16b and the clamped pipe (not shown in FIG. 12). When the clamp 10b is tightened on the pipe, the compressive force increases on the inverted flaps in the overlap region. The compressive force on the flaps increases the frictional constraint against creeping movement of the flaps relative to the outer layer of the clamp band 16b when the sidewalls are drawn into engagement with the respective sides of the reaction member.

The mechanical interlocks 33b and 35b in the clamp band 16b provide additional holding force on the respective flaps to increase the constraint against creeping movement of the flaps when the clamp is tightened. Each mechanical interlock comprises a cup-shaped indentation in the flap which is nested in a cup-shaped indentation in the clamp band 16b. The mechanical interlocks 33b and 35b may be omitted in applications of the clamp 10b where the frictional resistance provides sufficient constraint against creeping movement of the flaps.

Figure 12:
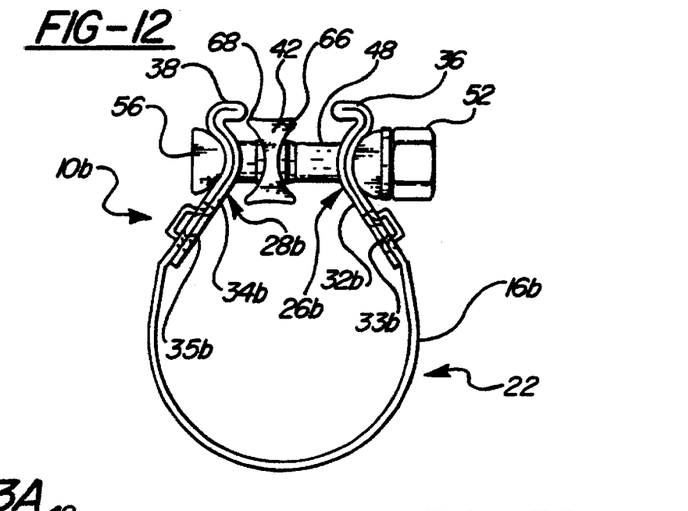
FIG. 12 is an end elevation view of the band clamp of a third embodiment of this invention before it is applied around a pipe.

The clamp 10b of FIG. 12 functions in the same manner as the clamp 10 of FIG. 1 in respect to the coaction of the stop members 36 and 38 with the abutments 66 and 68, respectively, to align the bolt holes with each other when the clamp is in the tightened condition.

Fourth Embodiment of the Invention

Figure 13A:
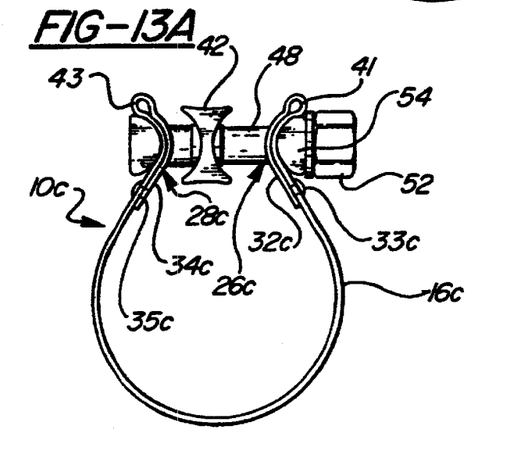
FIGS. 13A and 13B show a fourth embodiment of this invention.
Figure 13B:
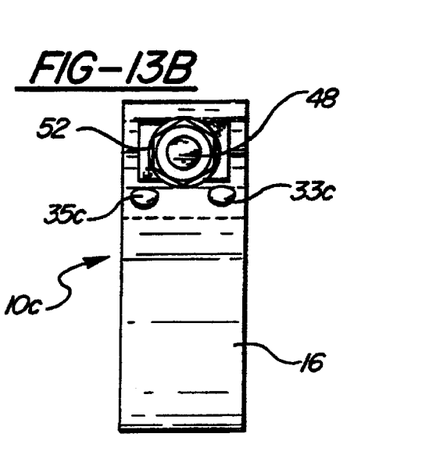

A fourth embodiment of the invention will now be described with reference to FIGS. 13A and 13B. This embodiment is similar to that of FIG. 12 in that it comprises inverted flaps. In the embodiment of FIG. 13A and FIG. 13B, the inverted flaps 32c and 34c are secured to the clamp band 16 by mechanical interlocks 33c and 35c which comprise a nesting indentations or dimples. It is noted that the sidewalls 26c and 28c are provided at their free ends with retaining members or bights 41 and 43. These retaining members are disclosed in greater detail in Cassel U.S. Pat. No. 4,312,526 cited above. The bights 41 and 43 are of a structure different from stop members 36 and 38 of FIG. 12 and do not coact with the spline 42 in the same manner, and do not operate to position the bolt holes of the sidewalls and spline in alignment with each other.

Fifth Embodiment of the Invention

Figure 14A:
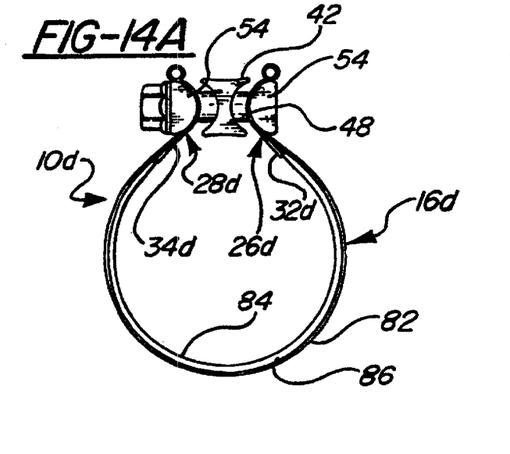
FIGS. 14A and 14B show a fifth embodiment of this invention.
Figure 14B:
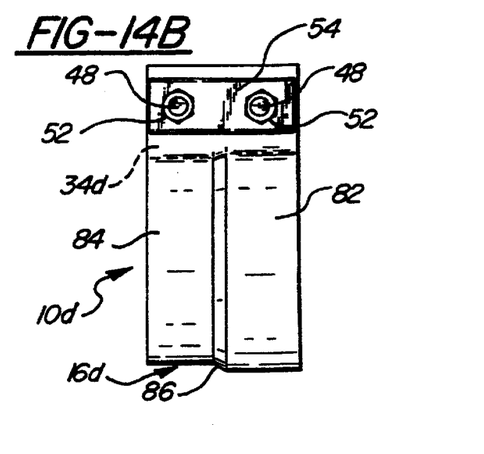

A fifth embodiment of this invention is shown in FIGS. 14A and 14B. The clamp 10d of this embodiment is a wide band clamp of the open loop type. Clamp 10d is especially adapted for a pipe lap joint and the clamp band 16d is provided with an end band 82 and end band 84 which are integrally joined with each other at a narrow circumferentially extending shoulder 86. End band 82 is of larger diameter than end band 84 and is adapted to engage the outer pipe of a lap joint while band 84 engages the inner pipe. This clamp is provided with a pair of bars 54, two sets of bolts 48 and nuts 52. A clamp of this type is disclosed in Cassel U.S. Pat. No. 4,312,526 the disclosure of which is incorporated herein by reference. The clamp of FIGS. 14A and 14B differs from the disclosure of the Cassel patent by the provision of inverted flaps 32d and 34d. It is noted that the sidewalls 26d and 28d of this embodiment are provided with retaining members or bights 41 and 43 in the same manner as the fourth embodiment.

Sixth Embodiment of the Invention

A sixth embodiment of this invention will now be described with reference to FIGS. 15A, 15B and 15C. The clamp 10e of this embodiment is a wide band clamp for use with either pipe butt joints or pipe lap joints; it is a flat band clamp of the type disclosed in Cassel U.S. Pat. No. 4,813, 720, the disclosure of which is incorporated herein by reference.

Figure 15A:
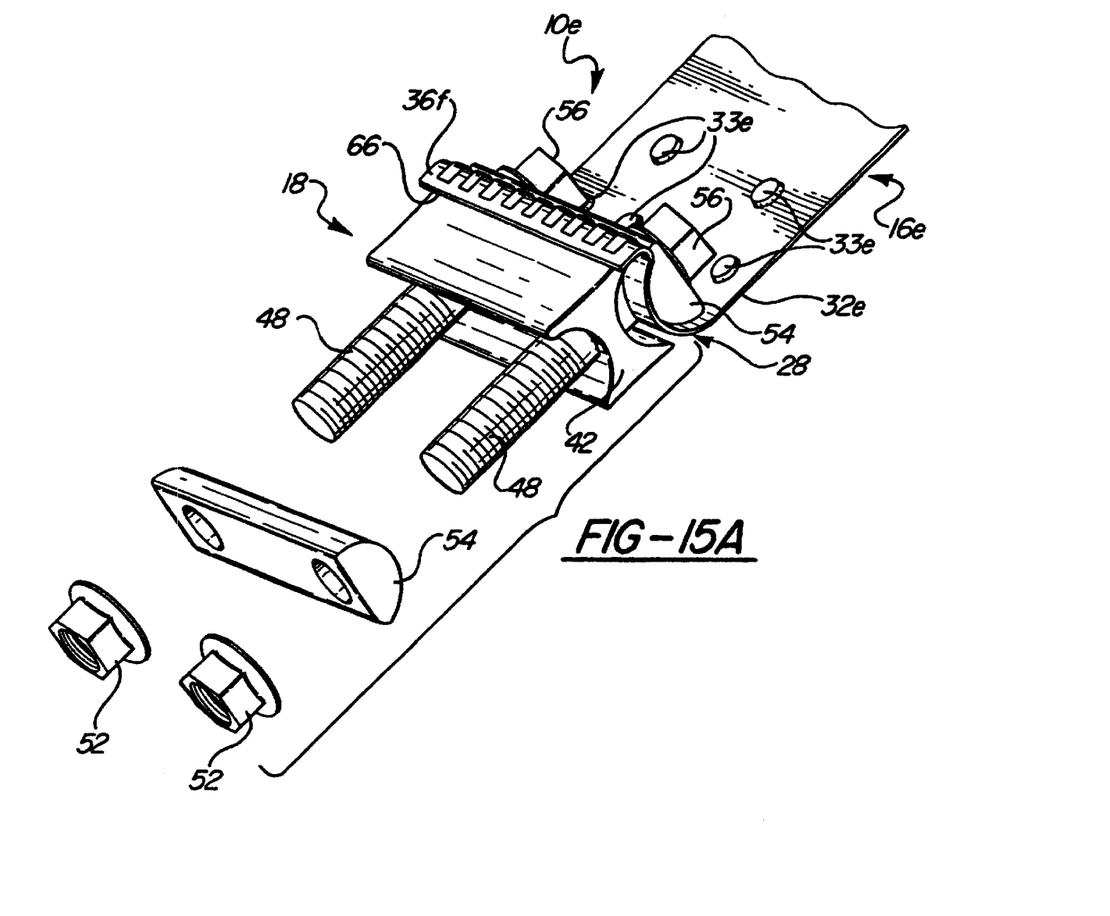
FIGS. 15A, 15B and 15C show a sixth embodiment of this invention.

FIG. 15A is a fragmented view of the band clamp in that only one end of the clamp band 16e is shown together with the tightening means 18. The other end of the clamp band 16e is a mirror image of the end which is shown and is adapted to be looped around a pair of pipes pipe joint and connected with the tightening means 18 in the same manner as shown in FIG. 14A of the fifth embodiment.

The embodiment of FIG. 15A is provided with an inverted flap 32e on the clamp band 16e, as shown, and a corresponding inverted flap on the other end which is not shown. It is also provided with a set of mechanical interlocks 33e, as shown, and corresponding set of interlocks on the other end of the band which is not shown. The embodiment of 15A differs from the embodiment of FIG. 14A and 14B by use of a stop member or ear 36f, as shown, on the free end of the sidewall 28. A corresponding stop member or ear is provided on the sidewall at the other end of the clamp band which is not shown.

Figure 15B:
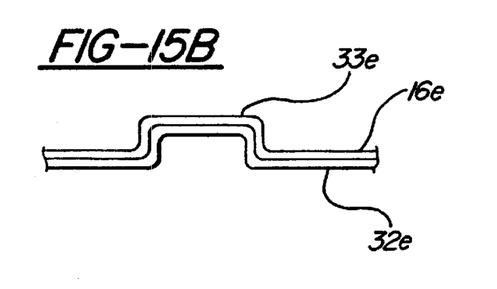
Figure 15C:
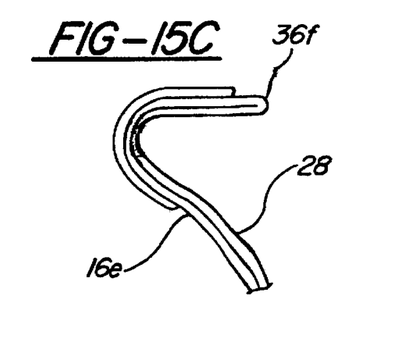

FIG. 15B is a cross-sectional view of a mechanical interlock 33*e*. FIG. 15C is a cross-sectional view of the stop member 36*f*. The stop member 36*f* is formed on the sidewall as a closed bight, i.e. the loop of the bight has no space between the opposed sides. The stop member or bight is provided with a set of protuberances or stiffeners which are equally spaced. The bight is hook-shaped and both sides of the bight are formed with nested elongated protuberances extending outwardly from the hook. The protuberances constitute a gusset or reinforcement rib.

The clamp 10*e* of FIG. 15A functions in the same manner as the clamp 10 of FIG. 1 in respect to the coaction of the stop members with the abutments.

Seventh Embodiment of the Invention

Figure 16A:
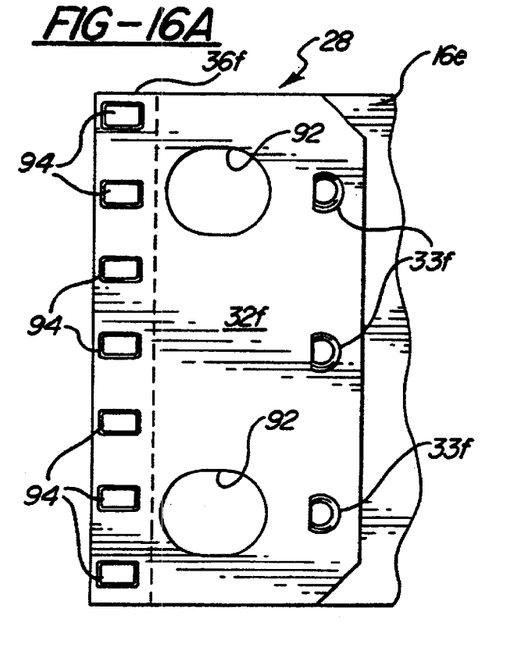
FIGS. 16A, 16B and 16C show a modified sidewall and stop member for the band clamp of FIGS. 15A, 15B and 15C.
Figure 16B:
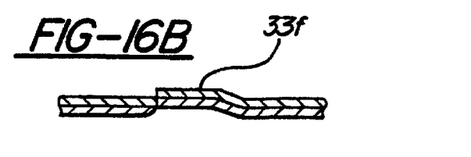
Figure 16C:
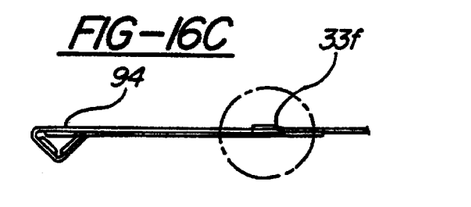

FIGS. 16A, 16B and 16C show an embodiment with a modified sidewall 28 for the clamp band 16*e* of FIG. 15A. FIG. 16A is a plan view of a sidewall 28 on one end of the clamp band 16*e*. The fragmented view of FIG. 16A shows the sidewall in a flat condition before it is preformed to the configuration shown in FIG. 15A. The sidewall 28 comprises an inverted flap 32*f* which is folded back from the clamp band 16*e*. The sidewall has a pair of elongated bolt holes 92 as described in the Cassel U.S. Pat. No. 4,813,720 cited above. The flap 32*f* is secured to the clamp band 16*f* by a set of mechanical interlocks 33*f*. FIG. 16B shows a cross-sectional view of the interlock structure. The sidewall 28 is provided at its free end with a retainer member 36*f*. The retainer member 36*f* extends from edge-to-edge of the double layered sidewall 28 which is crimped at equally spaced locations to form box-like stiffener elements 94 each having a cross-sectional configuration as shown in FIG. 16C.

Figure 17A:
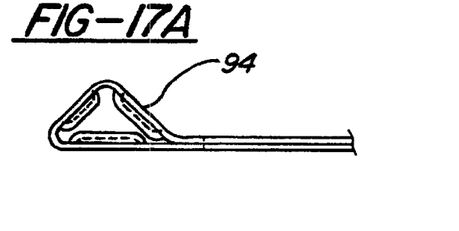
FIG. 17A shows additional detail of a structural feature of the band clamp of FIG. 16A.
Figure 17B:
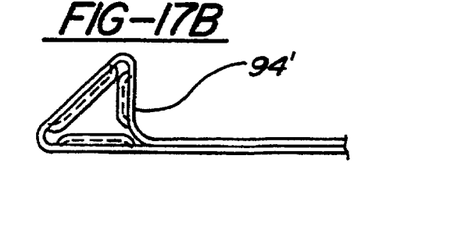
FIGS. 17B, 17C and 17D show modifications of the structural feature of FIG. 17A.
Figure 17C:
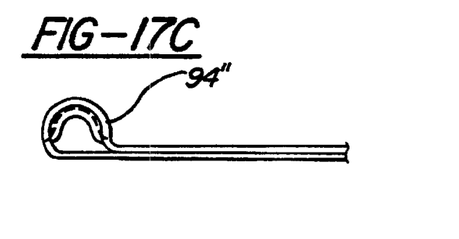
Figure 17D:
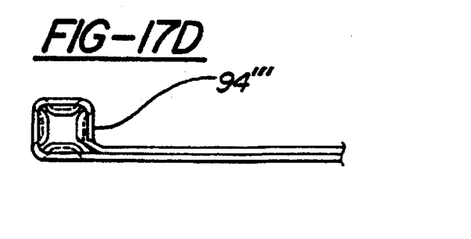

FIG. 17A shows the stiffener element 94 in greater detail with the open bight in an isosceles triangular configuration. In this configuration the base of the triangle is in alignment with the clamp band. FIG. 17B shows a stiffener element 94' in the form of a right triangle with the base of the triangle in alignment with the clamp band. FIG. 17C shows a stiffener element 94" where the bight is an open bight and is semi-circular in cross-section with an arcuate protuberance. FIG. 17D shows an open bight 94''' which is rectangular in cross-section with a protuberance on all four sides.

Eighth Embodiment of the Invention

An eighth embodiment of this invention will now be described with reference to FIGS. 18, 19 20 and 18A–18E. The clamp 10*g* of this embodiment is a band clamp adapted for use as a hose clamp, such as, for example, for clamping a silicone hose to a steel pipe end in a lap joint.

Figure 18:
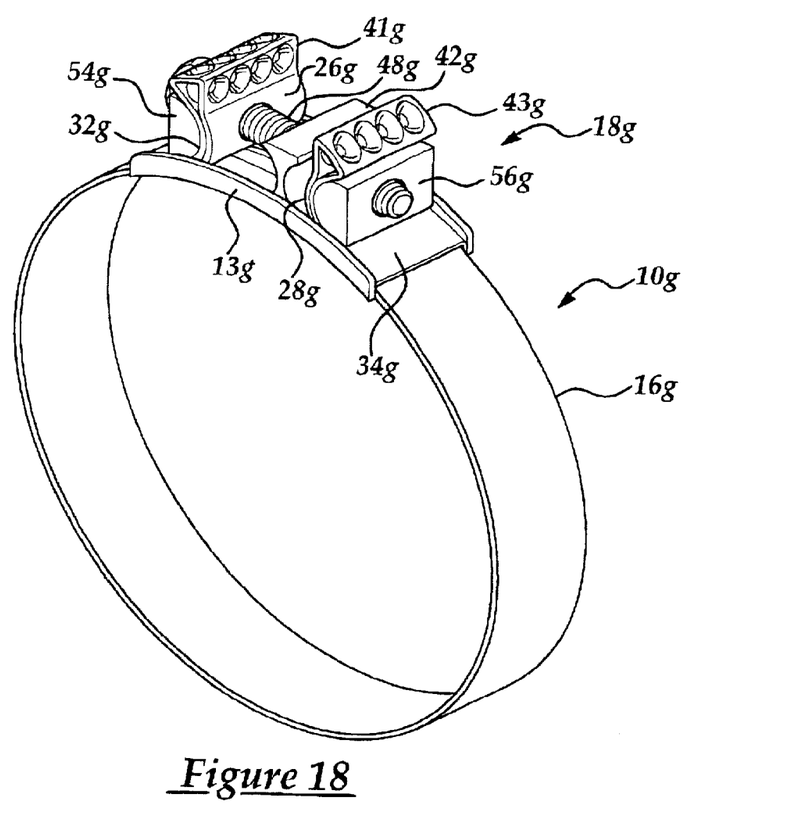
FIGS. 18, 19 and 20 show a band clamp of an eighth embodiment of this invention in its loosely assembled state.
Figures 19, 20:
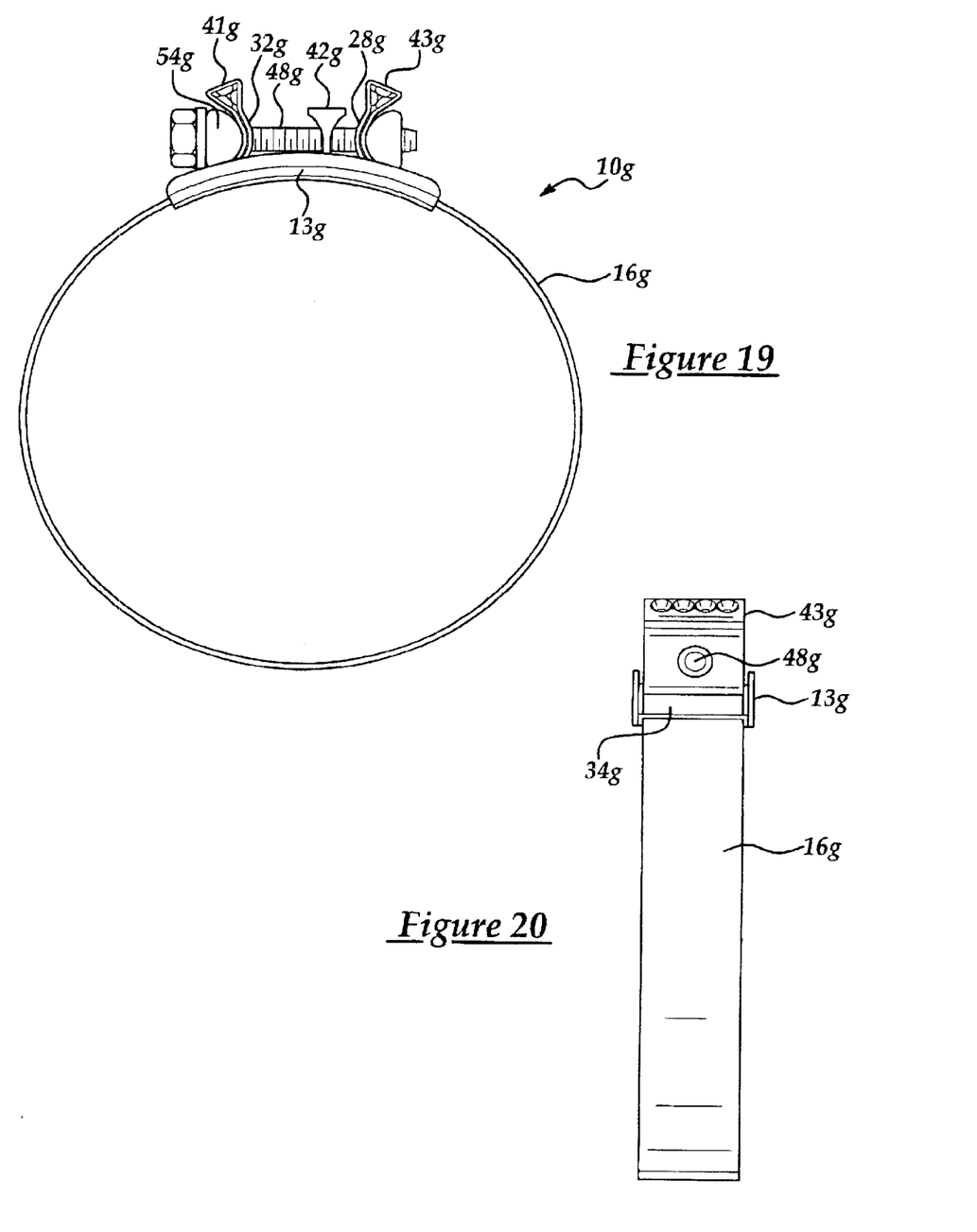

FIGS. 18, 19 an 20 show the band clamp 10*g* in its loosely assembled state in readiness for application to a lap joint.

The band clamp 10*g* comprises, in general, the clamp band 16*f* and a tightening mechanism 18*g*. It also comprises a pair of double-layer sidewalls 26*g* and 28*g* each of which is formed with outer layers or non-inverted flaps 32*g* and 34*g*. The sidewalls include retaining members or bights 41*g* and 43*g*. The flaps 32*g* and 34*g* are secured to the clamp band by mechanical interlocks. A channel-shaped tongue member 13*g* is disposed inside the clamp band and bridges across the tightening mechanism and is secured by a mechanical interlock at one end to the clamp band. The tongue member 13*g* thus forms an extension of the clamp band to provide a continuous or uninterrupted surface for engagement with the hose in the lap joint to be clamped.

The tightening mechanism 18*g* comprises a reaction member or spline 42*g* which is seated on the outer surface of the tongue member 13*g*. Spacer bars 54*g* and 56*g* are disposed on opposite sides of the sidewalls 26*g* and 28*g*. A bolt 48*g* extends through the spacer bars, sidewalls and spline and is in threaded engagement with the spacer bar 56*g*. When the bolt is tightened, the clamp band is tightened and stretched around the lap joint. This tightening action draws the retaining members or bights 41*g* and 43*g* into tight engagement with the respective spacer bars 54*g* and 56*g* and with the reaction member or spline 42*g*. The retainer members or bights 41*g* and 43*g* are constructed to exhibit high resistance to collapsing under the clamping force which tends to pull the bights between the spacer bars and the reaction member.

Figure 18A:
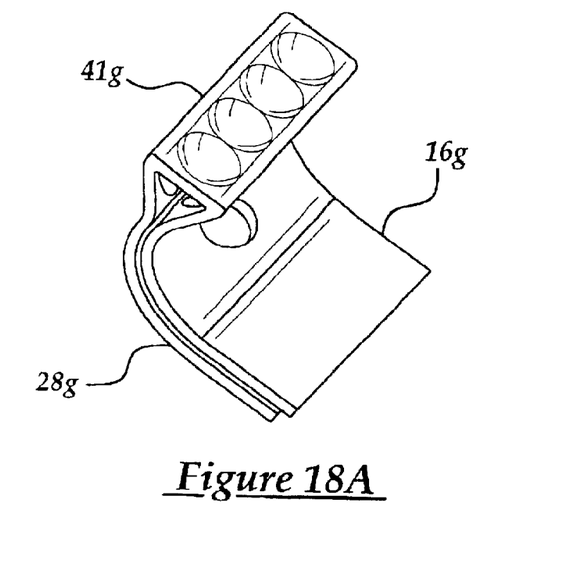
FIGS. 18A, 18B, 18C, 18D and 18E show details of structure of the retainer member of the band clamp of FIG. 18.
Figure 18B:
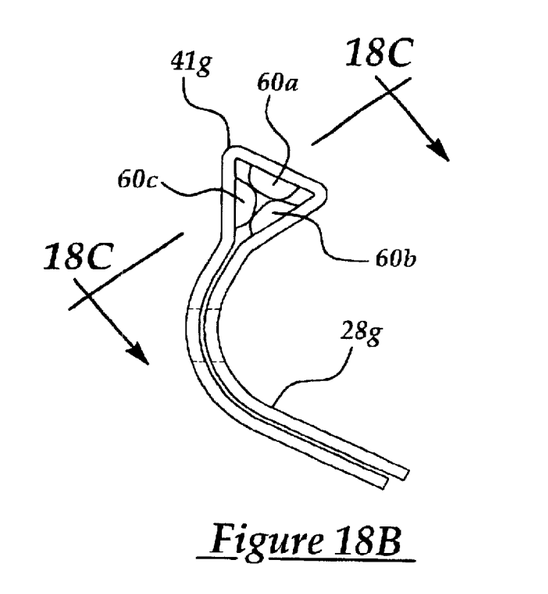
Figure 18C:
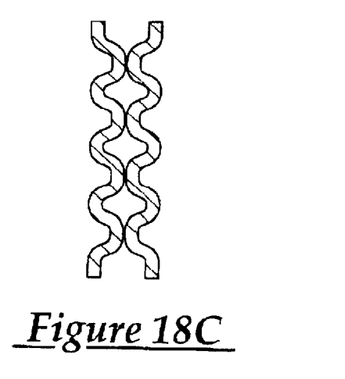
Figure 18D:
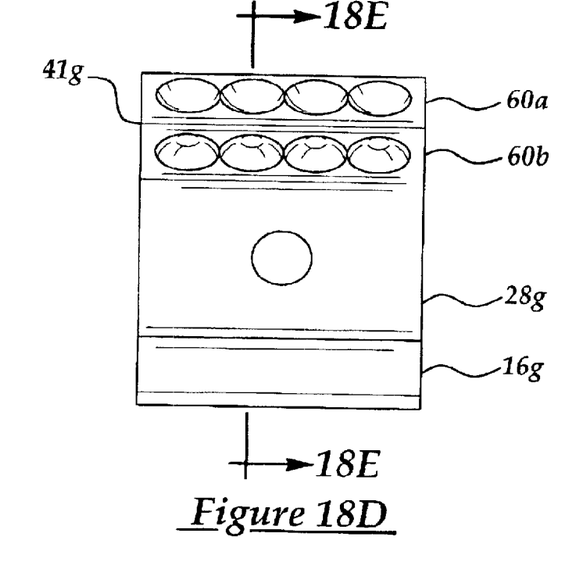
Figure 18E:
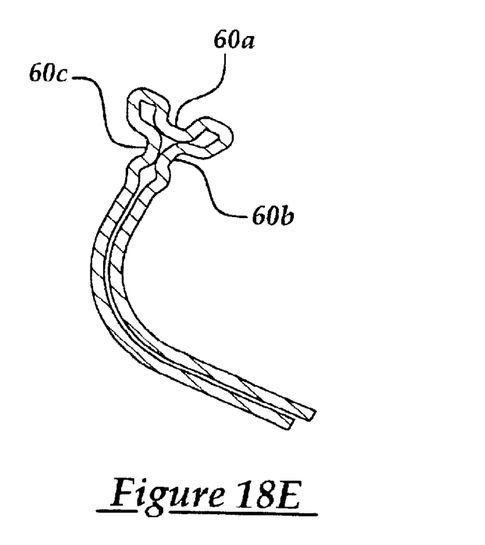

The retainer members or bights 41*g* and 43*g* will be described with reference to FIGS. 18A–18E. Each retainer member or open bight 41*g* and 43*g* is an open bight with a box-like structure which is triangular in cross-section. It preferably extends across the full width of the clamp band 16*g*. FIG. 18A shows a fragmentary perspective view of the clamp band and open bight 41*g*. The bight 41*g* is shown in a side view in FIG. 18B. Each of the three sides of the triangular bight is provided with a linear array of equally spaced inwardly directed protuberances 60*a*, 60*b* and 60*c*, respectively. Each of the protuberances is formed as a hollow dome from the sheet metal of the open bight 41*g*. This configuration is shown in FIG. 18C which is a cross-sectional view taken on lines B—B of FIG. 18B. FIG. 18D is an elevation view of the sidewall 28*g* and bight 41*g*. As shown in FIG. 18E, which is a cross-section taken on lines A—A of FIG. 18D, each set of protuberances 60*a*, 60*b* and 60*c* lie in the same cross-sectional plane as shown in FIG. 18E. In this arrangement, the protuberances 60*a*, 60*b* and 60*c* are in close proximity or engagement with each other inside the open bight 41*g*. Thus, when the clamp 10*g* is tightened the bights 41*g* and 43*g* cannot be collapsed or crushed because of the structural support of the protuberances. As a result, that the sidewalls 26*g* and 28*g* are firmly trapped against being pulled into the clamping mechanism.

The clamp band 16*g* is preferably formed from sheet steel and the protuberances are stamped while the material is in flat form and before it is folded to form the sidewalls 26*g* and 28*g* and the respective open bights 41*g* and 43*g*. Also, the mechanical interlocks are provided while the sheet material is flat. The clamp band 16*g* is preformed into the configuration shown in FIG. 18 as the final metal forming step.

CONCLUSION

Although the description of this invention has been given with reference to particular embodiments it is not to be construed in a limiting sense. Many variations and modifications will now occur to those skilled in the art.

What is claimed is:

1. In a pipe coupling of the type comprising a sleeve adapted to receive one pipe inside one end and another pipe inside the other end, said sleeve having a cross-section including a roundish sector and a radially projecting channel-shaped sector, said channel-shaped sector comprising a pair of sidewalls extending outwardly from the roundish sector and being separated from each other at the outer ends to form an opening in the sleeve, said sleeve comprising a single piece of sheet material and each of said sidewalls being folded back on itself to form a bight and provide a double layer of sheet material, a spline disposed between the sidewalls and having a concave surface opposite each sidewall, a pair of bars each having a convex surface, one bar being disposed against one sidewall opposite one concave surface of the spline and the other bar being disposed against the other sidewall opposite the other concave surface of the spline, each of said sidewalls having a retaining member including said bight on the outer edge thereof and disposed outwardly of the spline and the respective bar, and a force applying means including at least one bolt and nut with the bolt extending laterally through the bars, sidewalls and, said tightening means being adapted to draw the bars together and force the sidewalls against the concave surfaces of the spline with said retaining members being trapped against the outer surfaces of the spline and bars whereby the sleeve may be stretched around said pipes, the improvement wherein said bight in each of said retaining members has a plurality of protuberances extending from said sheet material for reinforcing said bight against deformation when it is drawn into engagement with said spline and bar.

2. The invention as defined in claim 1 wherein said bight is a closed bight and has a hook-shape in cross-section.

3. The invention as defined in claim 1 wherein said bight is an open bight and has a box-like triangular shape in cross-section with said protuberances extending inwardly of said triangular shape in alignment with each other.

4. The invention as defined in claim 3 wherein said triangular shape is an isosceles triangle.

5. The invention as defined in claim 3 wherein said bight is an open bight and said triangular shape is a right triangle.

6. The invention as defined in claim 1 wherein said bight is an open bight and is semi-circular in cross-section with an arcuate protuberance extending inwardly of said semi-circular shape.

7. The invention as defined in claim 1 wherein said bight is an open bight and is a rectangular shape cross-section with said protuberances extending inwardly of said rectangular shape, said protuberances being in alignment with each other.

8. The invention as defined in claim 7 wherein said rectangle is approximately a square.

* * * * *